July 25, 1961

R. A. MAHAFFY ET AL 2,993,597

WEIGHT CLASSIFYING DEVICE

Filed July 14, 1958

INVENTORS
Reid A. Mahaffy
John R. Harder
by Carlson, Pitzner, Hubbard & Wolfe
ATTORNEY

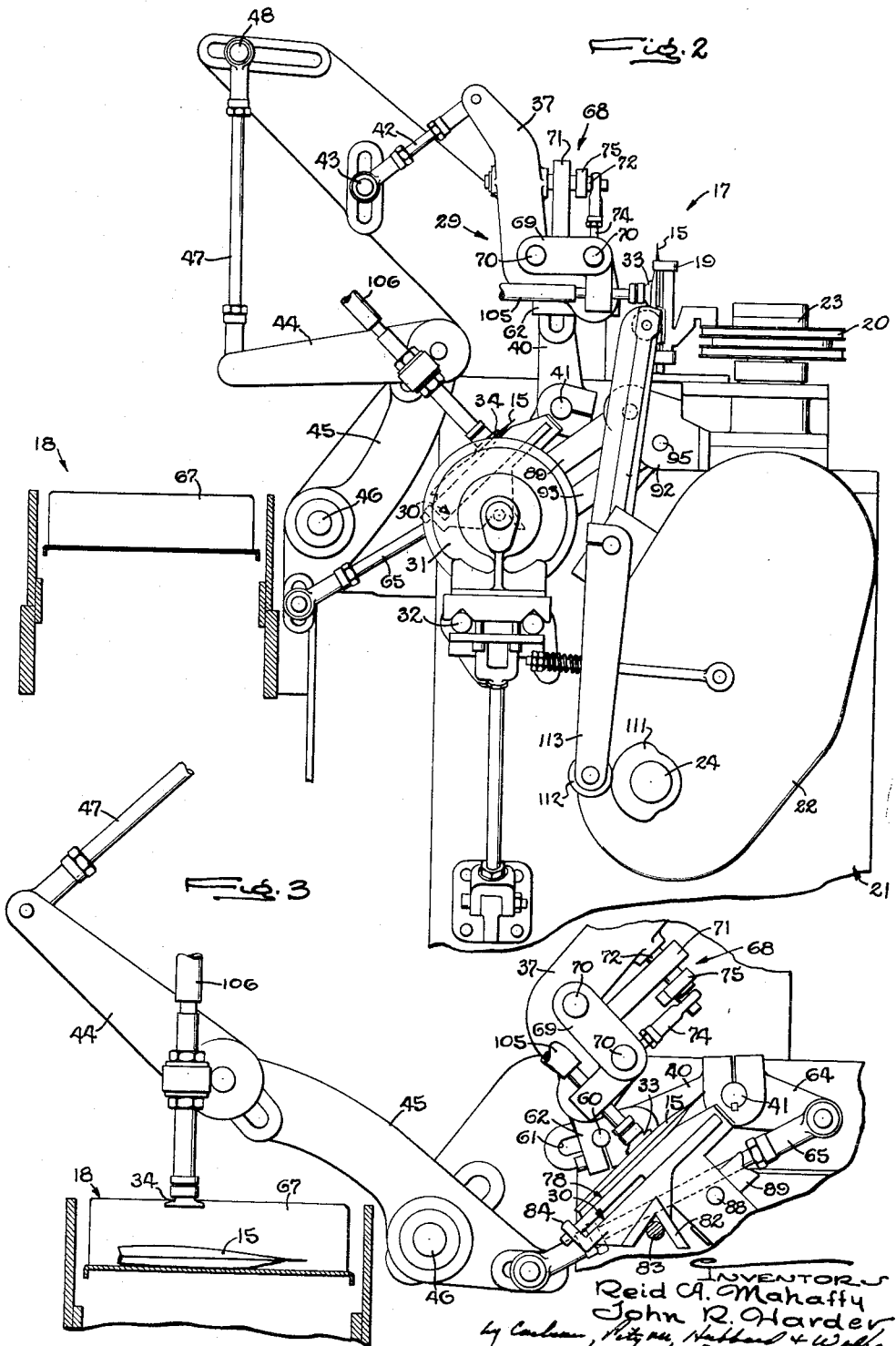

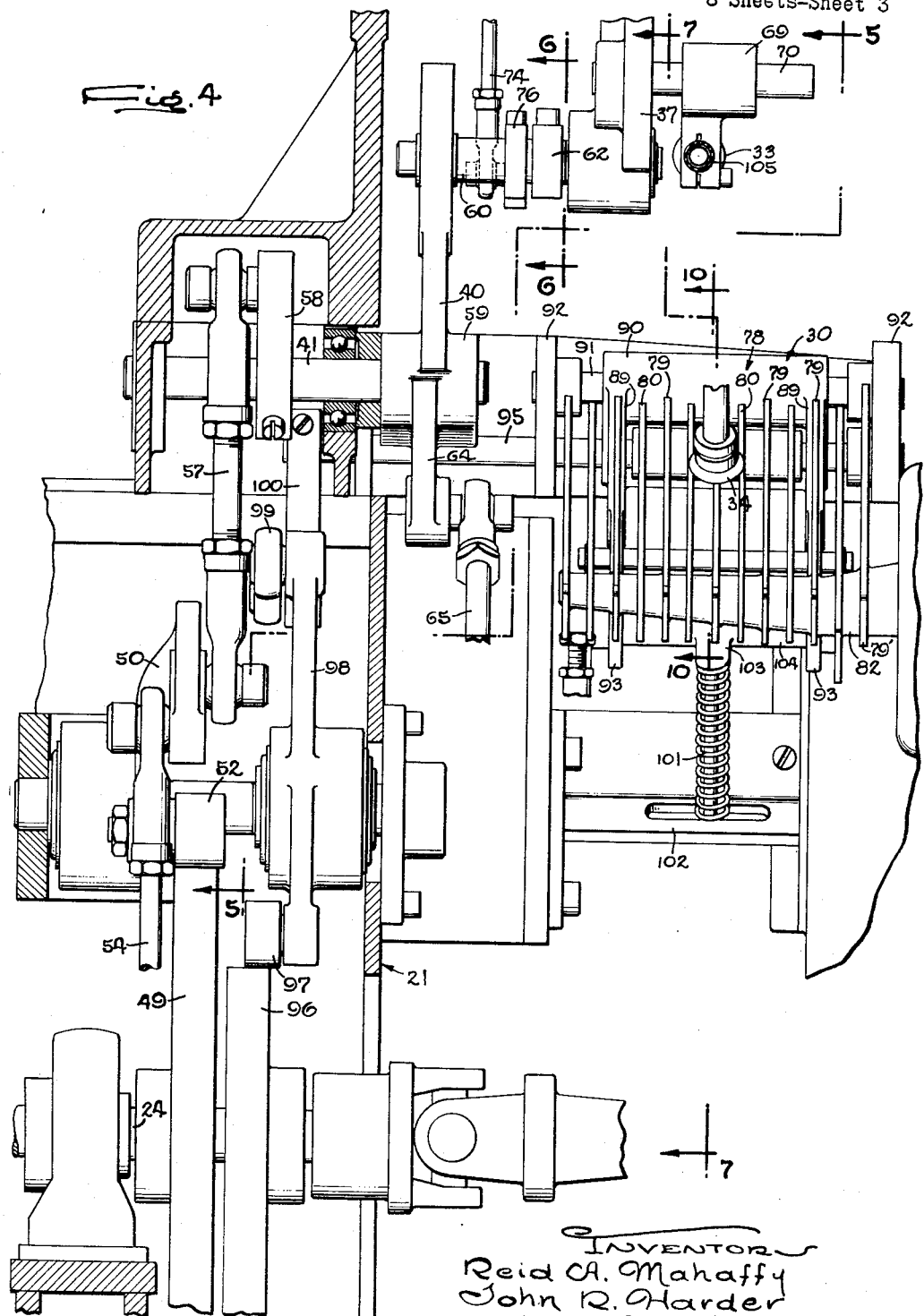

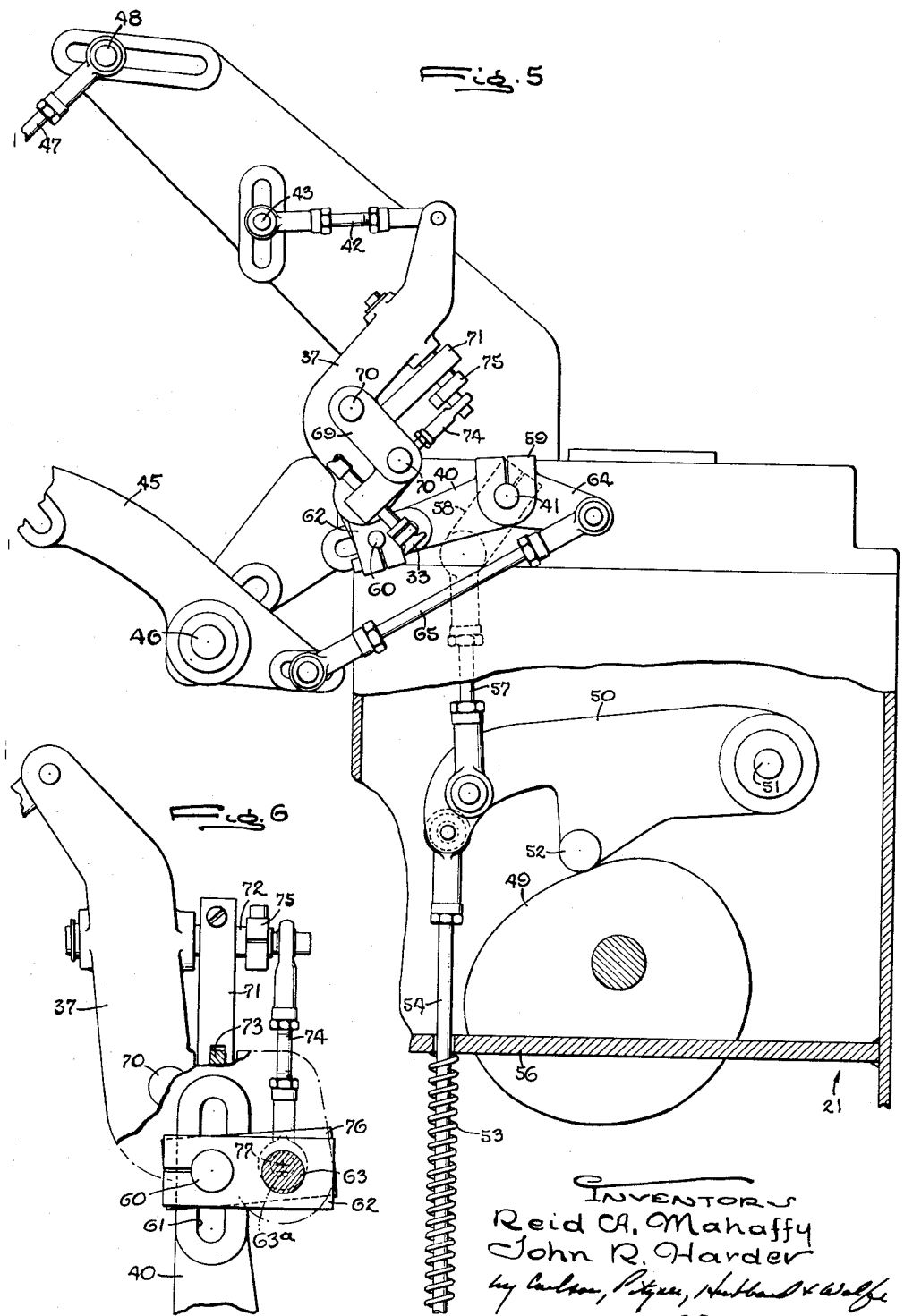

July 25, 1961  R. A. MAHAFFY ET AL  2,993,597
WEIGHT CLASSIFYING DEVICE
Filed July 14, 1958  8 Sheets-Sheet 5
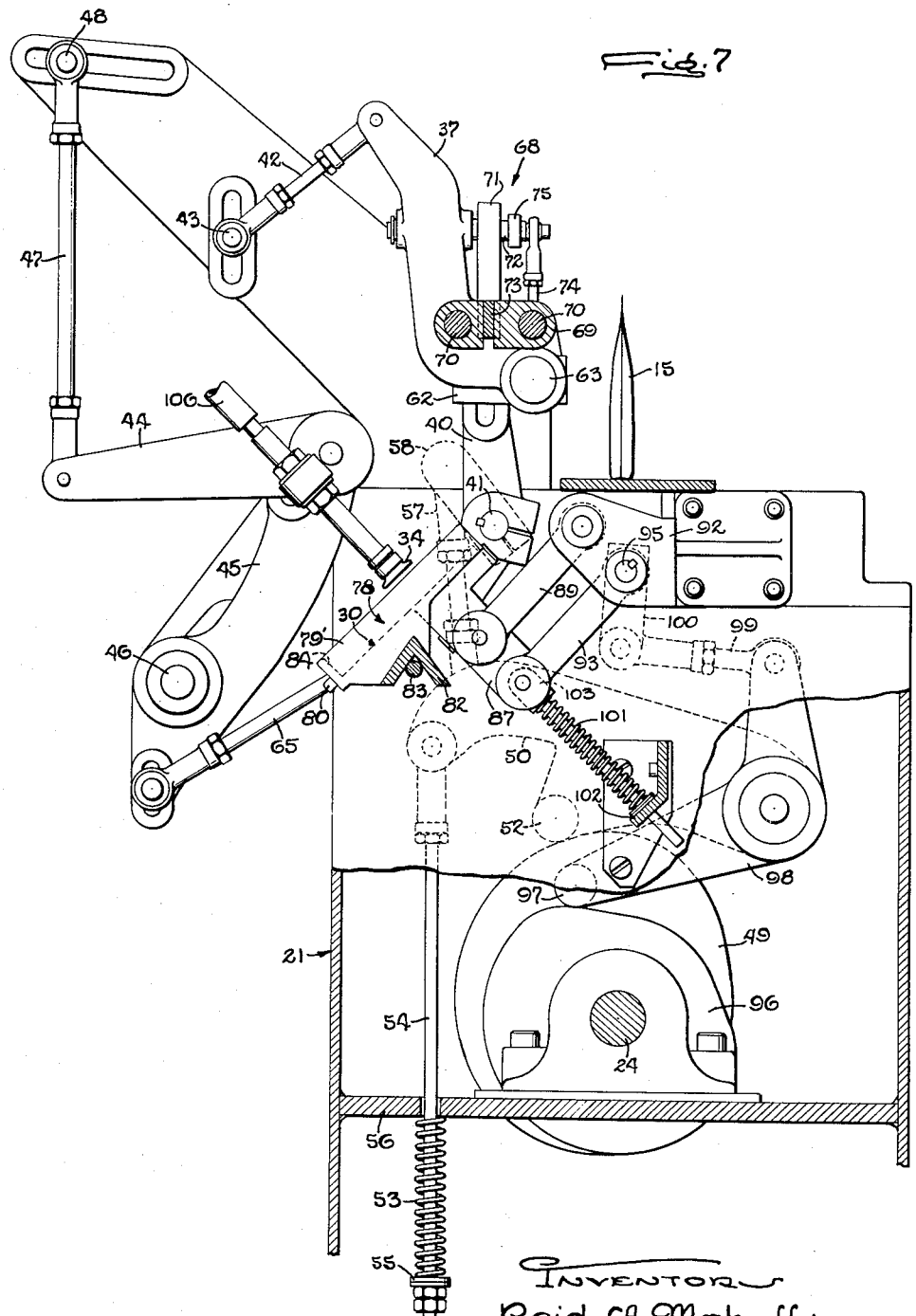
INVENTORS
Reid A. Mahaffy
John R. Harder
by Carlson, Pitzner, Hubbard & Wolfe
ATTORNEYS

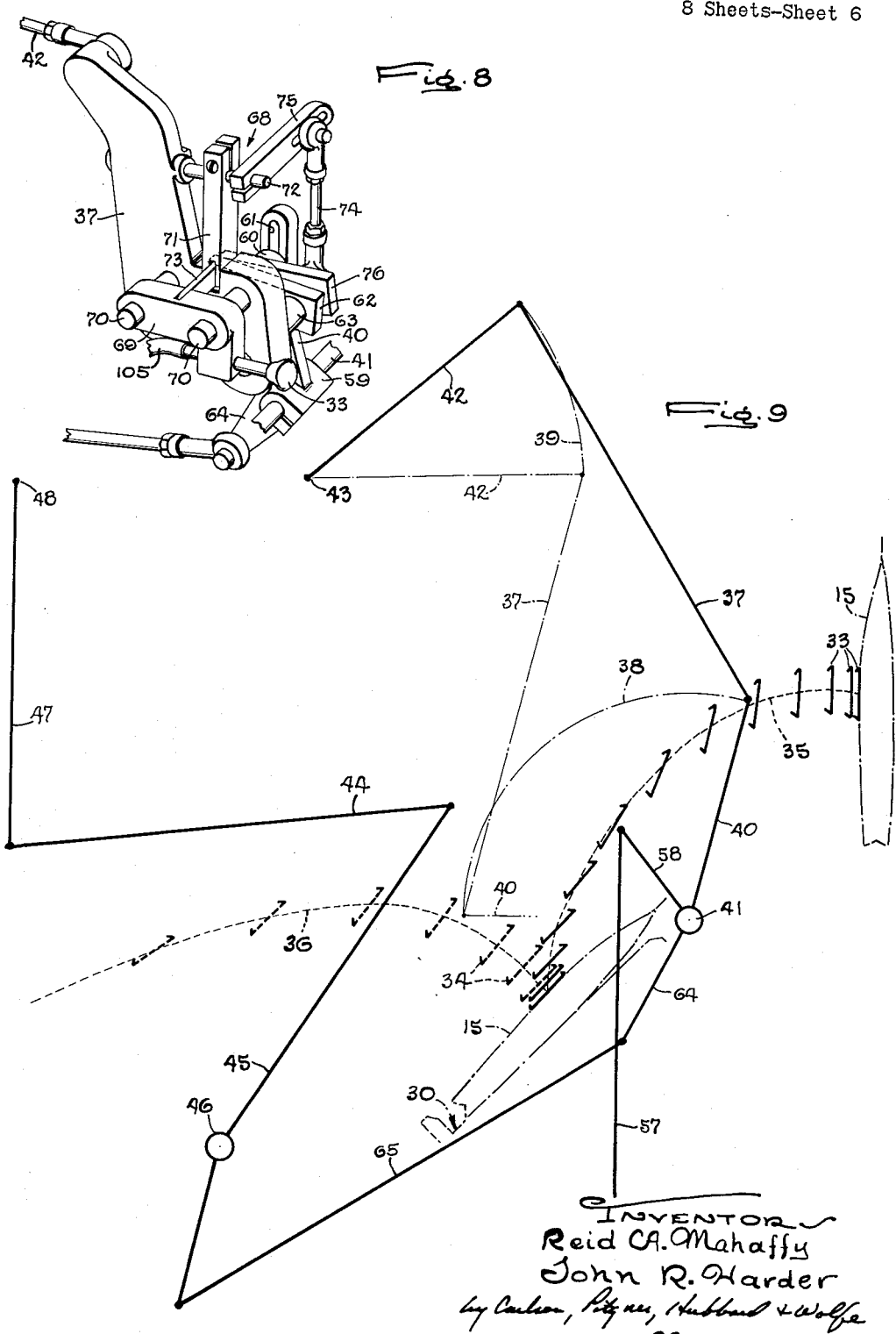

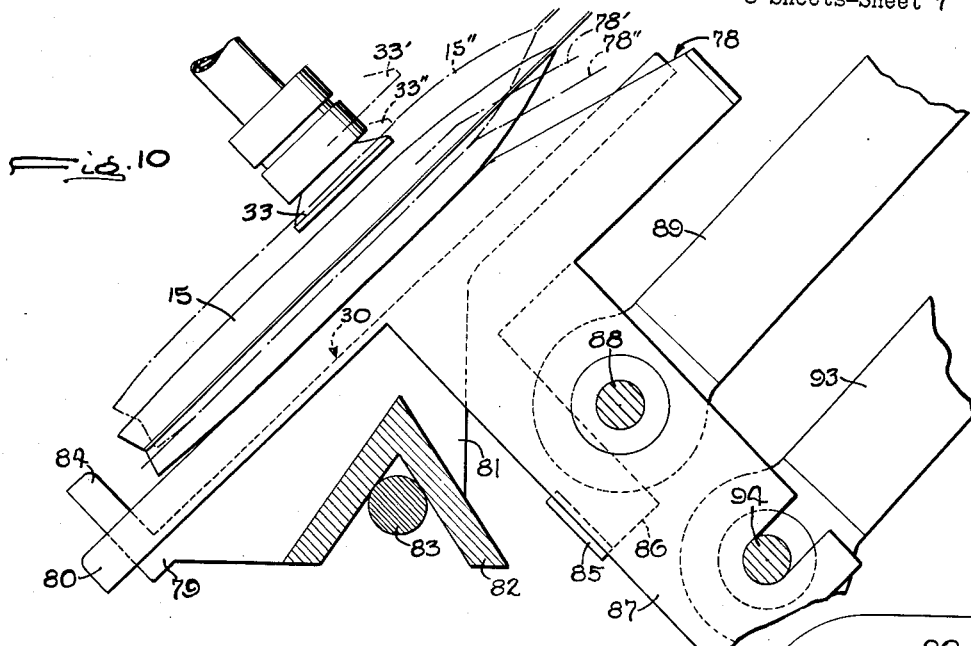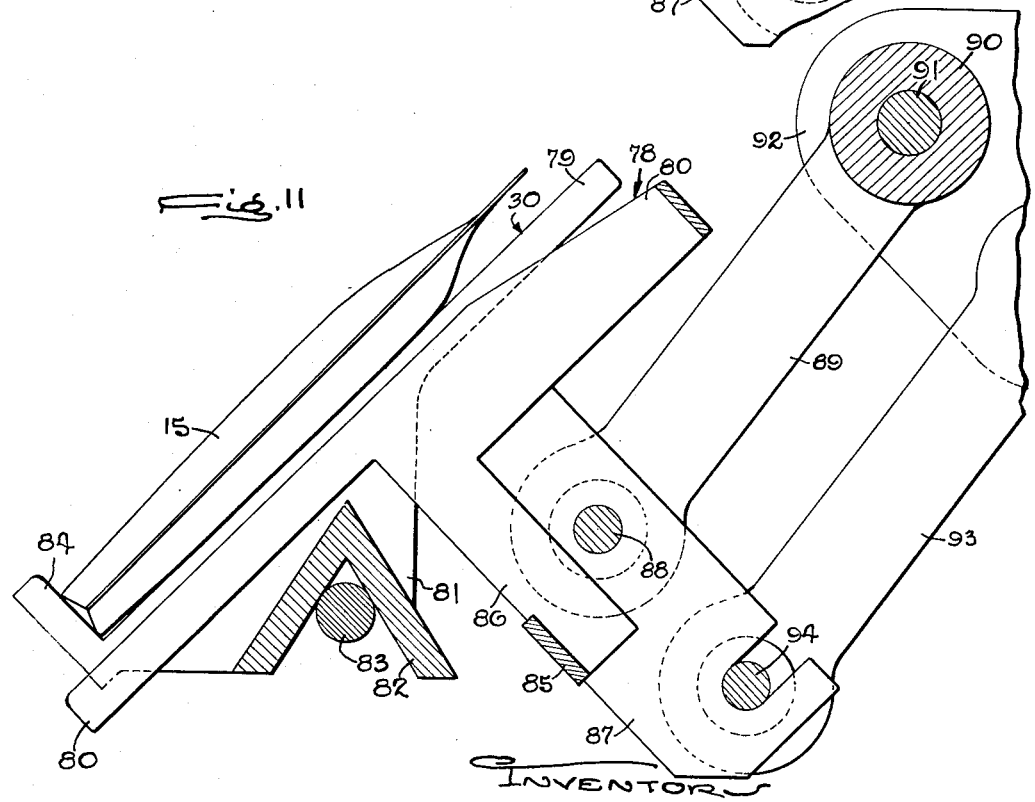

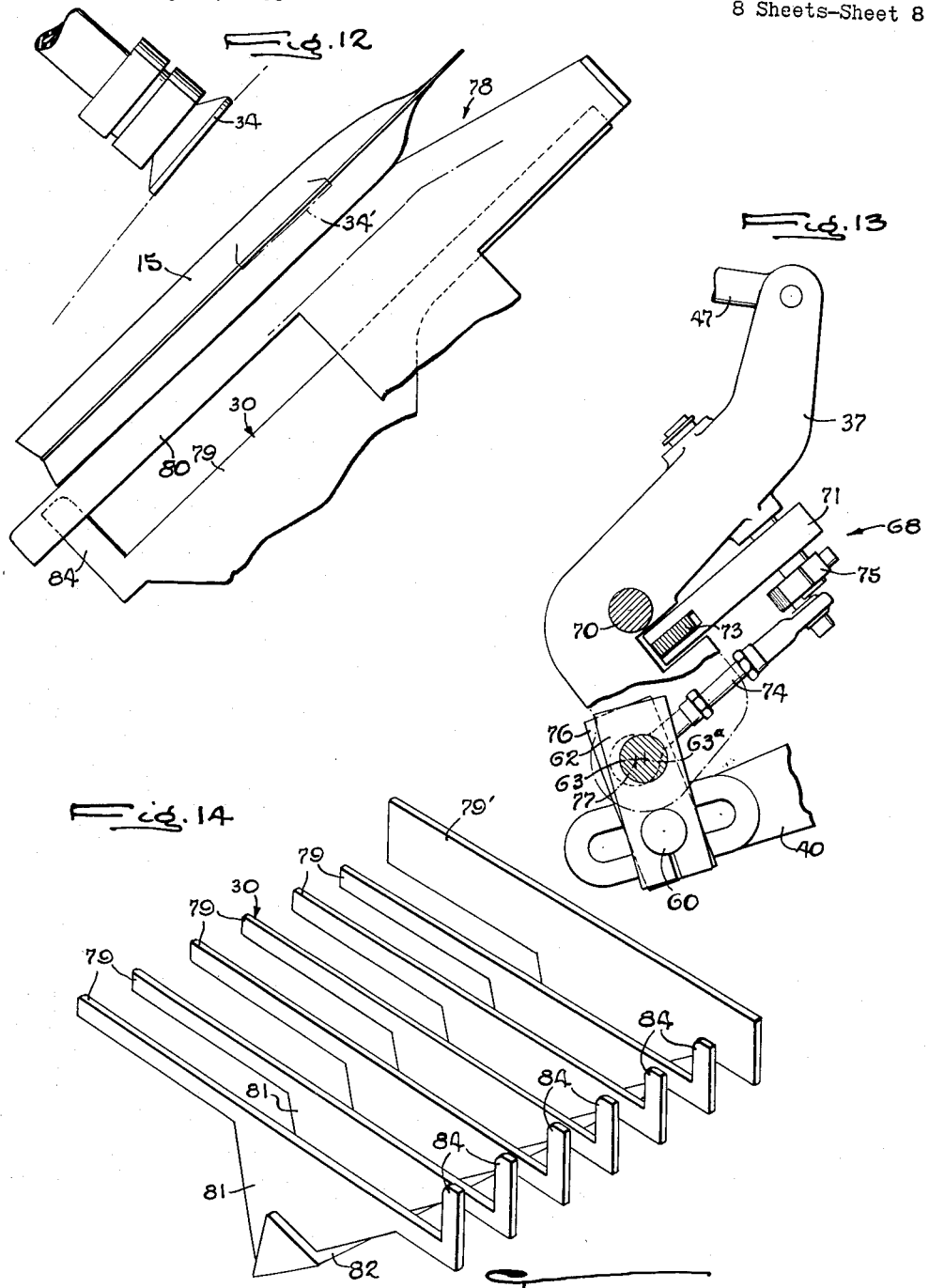

United States Patent Office 2,993,597
Patented July 25, 1961

2,993,597
WEIGHT CLASSIFYING DEVICE
Reid A. Mahaffy, Montclair, and John R. Harder, Cedar Grove, N.J., assignors to Bartelt Engineering Company, Rockford, Ill., a corporation of Illinois
Filed July 14, 1958, Ser. No. 748,228
13 Claims. (Cl. 209—121)

This invention relates to devices for check weighing packages as they are completed by a packaging machine so as to separate out from the succession of packages those packages which are of an improper weight. In arrangements of this type, the packages when completed by the packaging machine may be transferred to a conveyor which carries the packages to a station where a further operation, such as the insertion of the packages into cartons, may be performed. In many instances, it is desirable to check the weight of the packages as they leave the packaging machine and before they are carried to the next operation.

The general object of the invention is to provide a novel check weighing device of the above character which accurately classifies the packages, which is capable of operating at high speeds and which requires comparatively little space so that it may easily be interposed between a packaging machine and a conveyor.

A more detailed object is to arrange the conveyor so that its initial station laps the terminal station of the packaging machine and to interpose the platform of the weigher between the two so that the package may be transferred laterally from the packager to the platform and then to the conveyor.

Another object is to transfer the package onto the weigher platform in a novel manner so that forces due to impact and the like are uniform and predictable and hence do not affect the accuracy of the weighing.

A further object is to provide a means for shifting the package edgewise as it is transferred to compensate for instances in which the terminal station of the packager is offset from the initial station of the conveyor.

The invention also resides in the novel construction and arrangement of the mechanisms for transferring the package to the weigher platform and the conveyor, for shifting the package edgewise and for placing the package on the weigher platform.

Other objects and advantages of the invention will become apparent from the following detailed description taken in connection with the accompanying drawings, in which—

FIG. 2 is a fragmentary end view of the machine.

FIG. 3 is an enlarged fragmentary end view of the mechanism used for transferring the packages.

FIG. 4 is an enlarged fragmentary side elevation of the weighing device, parts being broken away and shown in section.

FIG. 5 is a fragmentary sectional view taken along the line 5—5 in FIG. 4.

FIG. 6 is an enlarged fragmentary sectional view taken along the line 6—6 in FIG. 4.

FIG. 7 is a fragmentary sectional view taken along the line 7—7 in FIG. 4.

FIG. 8 is a fragmentary perspective view of a portion of the transfer mechanism.

FIG. 9 is a diagrammatic view of the transfer mechanism.

FIG. 10 is an enlarged fragmentary sectional view taken along the line 10—10 in FIG. 4.

FIGS. 11 and 12 are views similar to FIG. 10 but showing the parts in different positions.

FIG. 13 is a view similar to FIG. 6 which shows the parts in a different position.

FIG. 14 is a perspective view of the platform of the weighing device.

Figure 1:
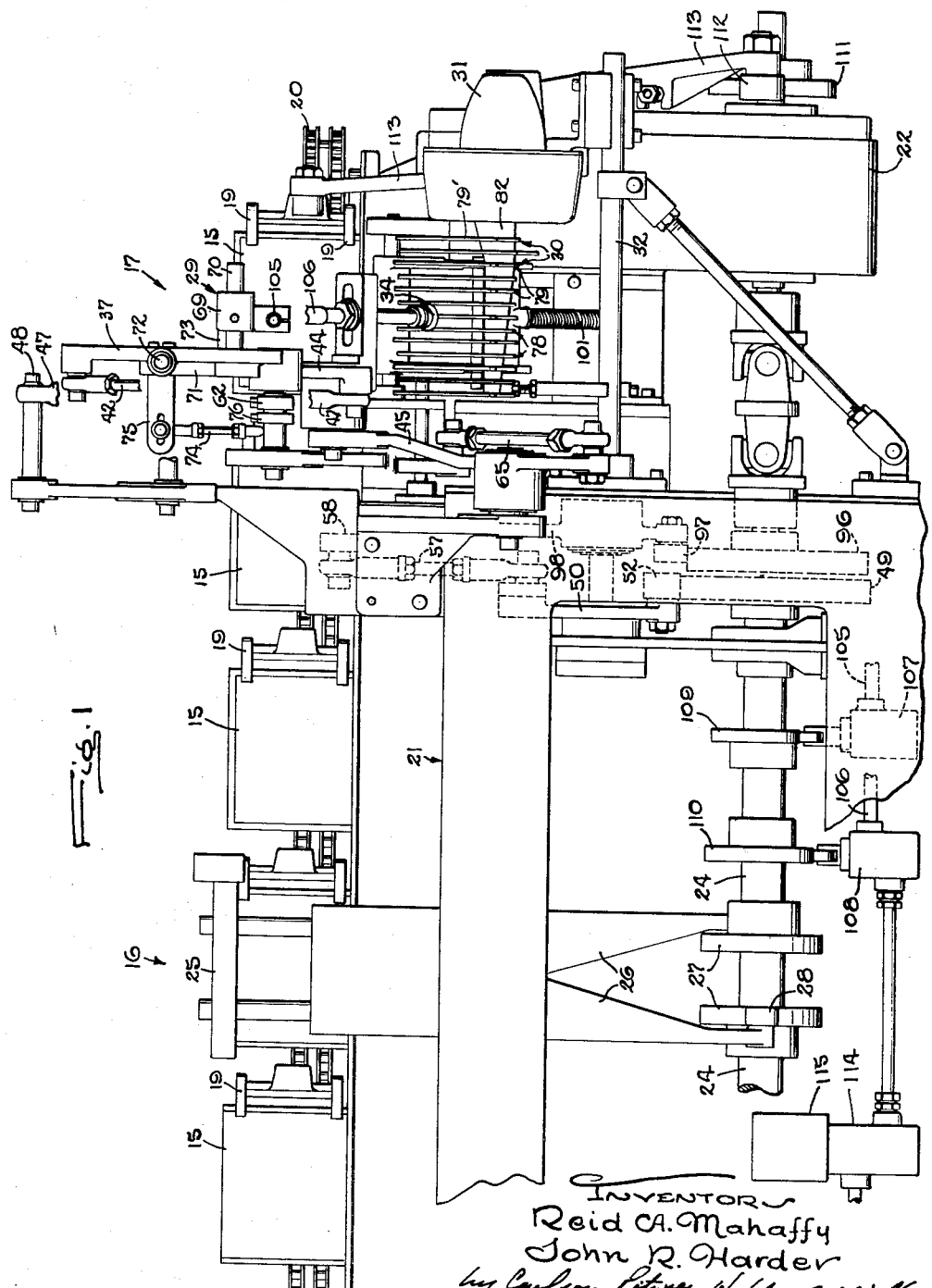
FIGURE 1 is a fragmentary side elevation of a packaging machine as used in conjunction with the novel check weighing device of the present invention.

As shown in the drawings for purposes of illustration, the invention is embodied in a machine for packaging a product in bags or pouches 15. Filled bags are advanced edgewise step by step along a horizontal path to a station 16 where the top of the bag is closed and, at the terminal station 17 of the machine, the bags are removed and may be transferred to a conveyor 18 (FIG. 2) which, for example, carries the bag to a machine (not shown) for inserting the bag in a carton. To advance the bags, the latter are gripped at their leading edges by clamps 19 which are supported by a horizontal endless conveyor chain 20 mounted on a frame 21. The chain is indexed through successive steps by a conventional Geneva mechanism 22 connected to one of the sprocket wheels 23 supporting the chain 20 and driven by a continuously rotating horizontal shaft 24 which is journaled on the frame 21. Preferably, the bags are made of or coated with a thermoplastic material and are sealed closed by heated shoes 25 which are carried on the upper ends of vertical levers 26 fulcrumed intermediate their ends on the frame. The shoes are swung together and against the top of the bag at the station 16 during a dwell of the chain 20 by cams 27 which are fast on the shaft 24 and engage followers 28 on the lower ends of the levers 26.

The present invention contemplates the provision of a novel means for accurately checking the weight of each bag 15 as it is removed from the conveyor 20 and for classifying the successive bags according to weight so that only bags of acceptable weight are transferred to the conveyor 18. This means comprises a transfer mechanism 29 which first removes each bag from the conveyor 20 and deposits it on the platform 30 of a weighing head 31. The latter is adjustably mounted on a bracket 32 projecting horizontally from the end of the frame 21 and senses the weight of the bag. If the bag is of the proper weight, the transfer mechanism 29 picks the bag off the platform and places it on the conveyor 18. Otherwise, the bag is removed from the weighing platform and discarded.

In the present instance, the platform 30 is located approximately midway between the conveyors 20 and 18 and is disposed at an angle of about 45 degrees to the horizontal. The transfer mechanism 29 includes two suction cups 33 and 34 (FIG. 2) which operate simultaneously to transfer one bag 15 from the conveyor 20 to the weighing platform and to move a previous bag from the platform to the conveyor 18 respectively. The suction cup 33 follows the curved path 35 illustrated in FIG. 9, backing away from the clamp 19, swinging over to the scale platform 30 and advancing toward this platform. The suction cup 34 follows a generally similar path 36 between the platform and the conveyor 18.

As shown in FIG. 9, the suction cup 33 not only follows the curved path 35 but also tips as it follows this path so that at one end of the path it faces the bag held by the clamp 19 and at the other end it faces the platform 30. This is achieved by mounting the cup on a floating lever 37 whose ends are swung through different arcs 38 and 39. Thus, the lower end of the lever is pivotally connected to the free end of an arm 40 which is fast on a horizontal shaft 41 journaled on the frame 21. Turning of the arm 40 through the arc 38 moves the suction cup from the conveyor 20 to the platform 30. The upper end of the floating lever 37 is pivotally joined to the free end of a link 42 whose other end is pivoted at 43 on the frame. The link causes the connected end of the lever to follow the arc 39 during swinging of the arm 40 so that the lever 37 and hence the cup 33 tip.

A similar arrangement is used to swing and tip the second suction cup 34, that is, the cup is mounted on a floating lever 44. One end of this lever is pivotally connected to an arm 45 pivoted on a horizontal shaft 46 while the other end is pivotally connected to the free end of a link 47 the opposite end of which is pivotally supported at 48 by the frame 21. In this way, the arm 45 swings the cup 34 from the platform 30 to the conveyor 18 and back while the link 47 guides the tipping of the cup.

Both suction cups 33 and 34 are moved together in timed relation to the advance of the chain conveyor 20 by a cam 49 fast on the camshaft 24 through a lever system. The latter includes a generally horizontal lever 50 (FIG. 5) which is fulcrumed at one end on the frame 21 by means of a shaft 51. Intermediate its ends, the lever 50 carries a follower roller 52 which engages the cam 49 and the lever is urged counterclockwise as viewed in FIG. 5 to hold the follower against the cam by a compression spring 53 which encircles a rod 54 pivotally connected at its upper end to the free end of the lever 50 and acts between an abutment 55 (FIG. 7) on the lower end of the rod and a horizontal partition 56 of the frame 21.

A generally vertical link 57 is pivotally connected at its lower end to the free end of the lever 50 and at its upper end to the outer end of an arm 58 which is secured to the horizontal shaft 41 so that the cam 49 acts through the lever 50, the link 57 and the arm 58 to turn the shaft 41. Since the arm 40 is rigid with a hub 59 which also is fast on the shaft 41, this arm is swung to move the floating lever 37. As shown in FIGS. 4, 6 and 8, the pivotal connection between the arm 40 and the floating lever 37 comprises a horizontal shaft 60 adjustably clamped in a slot 61 in the outer end of the arm 40 and carrying a second arm 62 also secured to the shaft 60 and projecting perpendicularly to the arm 40. At its outer end, the arm 62 is joined to the lower end of the floating lever 37 by a pivot 63 which completes the coupling between the floating lever and the cam 49.

In order to swing the lever 44 from the cam 49, another arm 64 also is formed integrally with the hub 59 (FIGS. 4 and 5) and projects away from the arm 40. A link 65 is pivotally connected at one end to the arm 64 and at the other end to one end of the lever 45 which is fulcrumed intermediate its ends at 46. As described above, the other end of the lever is pivotally joined to one end of the floating lever 44 which carries the suction cup 34.

In some installations, the bags removed from the weighing platform 30 may be placed in carriers 67 (FIGS. 2 and 3) on the conveyor 18 and, for various reasons such as space requirements, the carrier to be loaded may not be alined with the bag at the station 17. To compensate for this, means is provided to shift the bag laterally as it is handled by the transfer mechanism 29. Herein, this means operates during the transfer of the bag from the clamp 19 to the weighing platform 30 and includes a bell crank lever 68 (FIG. 8) which is turned as an incident to the swinging of the floating lever 37 and, upon such turning, shifts the suction cup 33 laterally of the floating lever.

To support the suction cup 33 on the lever 37 for lateral shifting, the cup is mounted on a block 69 which slides on parallel pins 70 projecting horizontally from the side of the lever. One arm 71 of the bell crank lever 68, which is fulcrumed on a shaft 72 projecting horizontally and inwardly from the floating lever 37, is connected to the block 69 by means of a link 73 so that turning of the bell crank lever slides the block on the pins 70. A link 74 (FIGS. 4, 6 and 8) is pivotally connected at one end to the other arm 75 of the bell crank lever and at the opposite end to an arm 76 fast on the shaft 60. As shown in FIGS. 6 and 13, the center of the pivot 77 joining the link 74 and the arm 76 is offset with respect to the center 63a of the shaft 63. Thus, when the floating lever 37 is turned about this shaft upon swinging of the arm 40, the longer radius of the center 77 will cause the link 74 to move relative to the floating lever. This rocks the bell crank lever 68 which, in turn, shifts the block 69 and hence the suction cup 33 laterally. The arm 76 is adjustably supported on the shaft 60 so that distance between the center 63a of the shaft 63 and the pivot 77 may be varied to obtain the desired amount of lateral shifting.

In accordance with another aspect of the invention, the weighing assembly is constructed in a novel manner so that extraneous forces and vibrations which might be caused by the placing of the bag 15 on the scale platform 30 and the removing of the bag from the platform substantially are eliminated and, in any event are uniform and predictable so that they may be compensated for and do not affect accuracy. This is achieved through the use of a member 78 (FIGS. 10 through 12) which is raised above the platform to receive the bag from the suction cup 33 and then is lowered beneath the platform leaving the bag on the platform. When the weighing is completed, the member is raised again to deliver the bag to the suction cup 34. Since the member supports the bag from underneath, it neither drops the bag nor pushes against the scale platform in delivering or removing the bag. By thus eliminating the forces and vibrations which otherwise would be caused in transferring the bag, the time required for damping before an accurate indication of weight can be obtained is minimized.

Herein, the scale platform 30 is formed by a series of laterally spaced parallel bars 79 and the member 78 is in the form of a grid or table similarly made up of parallel bars 80 which move through the spaces between the bars of the scale platform. The bars 79 of the platform 30 include depending portions 81 which are notched to receive an inverted angle bar 82 extending horizontally and transversely of the platform bars. A rod 83 projecting outwardly from the weighing head 31 and through the angle bar is welded to the latter to connect the platform to the head. Fingers 84 upstanding from the lower ends of the bars 79 prevent the bag from sliding off the scale platform as shown in FIG. 11. An end bar 79' (FIG. 14) is similarly connected to the angle bar 82 and projects above the bars 79 to prevent the bag from slipping laterally from the platform.

As illustrated in FIGS. 4 and 11, the bars 80 of the member 78 are parallel to and alined with the spaces between the bars 79. A plate 85 spanning and welded to legs 86 depending from the intermediate bars 80 joins the latter into a rigid unit and connects these bars to larger legs 87 depending from the end bars 80. Horizontal pivots 88 (FIG. 10) connect upper ends of the legs 87 to one end of each of two links 89 (see FIG. 4). These links are disposed at opposite ends of the table 78 and their other ends are cast integrally with a sleeve 90 which encircles a horizontal shaft 91 supported by a bracket 92 on the frame 21. A second pair of links 93 are parallel to the links 89 with one end pivotally connected to the legs 87 by a pin 94 spanning the legs. The other ends of the links 93 are keyed to a shaft 95 (FIGS. 4 and 7) paralleling the shaft 91 and journaled in the frame 21. Thus, the links 89 and 93 support the bars 80 to swing up and down between the bars 79 and also constitute a parallelogram linkage which maintains the bars 80 parallel to the bars 79 during such swinging.

Swinging of the links 89 and 93 in timed relation to the movements of the suction cups 33 and 34 is effected by a cam 96 fast on the camshaft 24 and engaged by a follower roller 97 (FIGS. 4 and 7). The roller is journaled on one arm of a bell crank lever 98 journaled on the frame. A link 99 is pivotally connected at one end to the other arm of the bell crank lever and at the opposite end to an arm 100 keyed to the shaft 95. Thus, the cam 96 rocks the bell crank lever 98 which through the link 99, the arm 100 and the links 89 and 93, moves the table 78 up and down. The parts are urged in a direction to hold the follower 97 against the cam 96 by a helical compression spring 101 acting between a stationary abutment 102 on the frame 21 and a lug 103 on a spacer sleeve 104 encircling the pin 94.

The cam 96 is shaped relative to the shape of the cam 49 so that the table 78 is in its uppermost position (shown at 78′ in FIG. 10) as the suction cup 33 approaches the weighing platform 30. At this time, the table starts down, moving with the suction cup, but the cup moves faster to place the bag on the table (shown at 15″, 33″ and 78″). Before the table reaches the level of the platform and after the bag is on the table, the cup releases the bag which then supports the bag. As the bars 80 of the table 78 move below the bars 79 of the platform 30, the bag is transferred to the platform and, after a short time delay to eliminate the effects due to impact of the package on the platform, the head 31 senses the weight of the bag (FIG. 11).

During the weighing operation, the suction cup 33 is moved by the cam 49 back towards the station 17 and the suction cup 34 is brought into position over the scale platform 30. Upon completion of the weighing, the table 78 is moved up (FIG. 12) and picks the bag off the platform 30. As the table approaches its uppermost position, the suction cup 34 begins to move away, that is, in the same direction as the table. When the table catches up with the cup, the latter picks up the bag and carries it to the conveyor 18.

In order to pick up and release the bags at the proper times, the suction cups 33 and 34 are connected to a suitable vacuum source (not shown) through flexible hoses 105 and 106 and valves 107 and 108 respectively (see FIGS. 1 and 2). The latter are actuated by cams 109 and 110 which, like the other cams, are fast on the camshaft 24. The cam 109 is shaped relative to the cam 49 so that the suction cup 33 communicates with the vacuum source when the cup engages the bag at the station 17 and before this bag is released from the clamp 19. Such release is effected by another cam 111 (FIG. 2) which is secured to the camshaft and, through a follower 112, swings an upright lever 113 fulcrumed intermediate its ends on the frame 21 and engaging the clamp 19 at the station 17. The valve 107 remains open as the cup swings over to the weighing platform 30 and then is closed by the cam 109 as the cup and the table 78 move down together toward the platform. In a like manner, the valve 108 is opened by the cam 110 so the suction cup 34 may pick the bag off the table as the cup and the table move up together away from the scale platform and this valve is closed when the cup is over the conveyor 18 to drop the bag into one of the carriers 67.

Advantage is taken of the incline of the table 30 to discharge bags which are of improper weight. For this purpose, the suction cup 34 is cut off from the vacuum source in response to a signal from the head 31 that the bag is not of the desired weight. When this happens, the bag still is supported by the table 78 when the latter reaches its upper position (full lines in FIG. 12) which is beyond the fingers 84. At this time, nothing holds the bag which therefore slides off the table and into a suitable receptacle (not shown). To cut off the suction cup 34 from the vacuum source under such conditions, a valve 114 is interposed between the vacuum source and the valve 108 and is actuated by a solenoid 115. The valve normally is open so that the suction cup is under the control of the valve 108. In a manner well known in the art, however, the head 31 energizes the solenoid when a package of improper weight is on the platform 30 and this prevents the cup 34 from picking the bag off the table 78.

Operation

With the parts in the position shown in FIGS. 1 and 2, the suction cup 33 is forward and engages the bag 15 at the station 17. At this time, the valve 108 is open connecting the cup with the vacuum source and the cam 111 has swung the lever 113 to open the clamp 19 so that the bag is held by the suction cup. The cam 49 then begins to swing the lever 40 counterclockwise as viewed in FIG. 2.

Swinging of the lever 40 turns the floating lever 37 to bring the suction cup 33 over the scale platform 30 and, since the upper end of the floating lever is supported by the link 42, the cup also is tilted so that it faces the platform during the final portion of this movement. Before the suction cup reaches the scale platform, the cam 96 has elevated the table 78 above the platform as shown at 78′ in FIG. 10. As the cup approaches the table, the latter begins to move down with the cup. The cup overtakes the table and places the bag on the table at which time the valve 107 is closed whereby the cup releases the bag. Such release occurs while the table is still above the platform 30 and, after the release, the forward movement of the cup is stopped.

With the bag supported only by the table 78, the latter continues its downward movement and, as the bars 80 of the table pass between the bars 79 of the scale platform 30, the bag is transferred to the platform (see FIG. 11). At this time, the head 31 senses the weight of the bag and, if the bag is of a proper weight, the solenoid 115 is not energized and the valve 114 remains open. Should the weight of the bag be improper, the solenoid is energized to close the valve.

During the weighing operation, the cam 49 swings the suction cup 33 back to its starting position and into engagement with the next bag which has been advanced by the chain 20 to the station 17. At the same time, this cam also swings the lever 45 clockwise as viewed in FIG. 3 toward the position shown in FIG. 2. This moves the suction cup 34 over the scale platform 30 and the cup stops short of the bag in the position shown in broken lines at 341 in FIG. 12. In the meantime, the cam 96 begins to raise the table 78 which picks the bag off the platform. As the table approaches the suction cup, the latter begins to back away. The table, however, moves faster than the suction cup and raises the bag into engagement with the cup. The latter then continues away from the table and swings over to the conveyor 18. When the bag engages the cup, the valve 108 has been opened by the cam 110 and, if the solenoid 115 has not been energized to close the valve 114, the cup is connected to the vacuum source and carries the bag to the conveyor 18. If the solenoid has been energized, the bag remains on the table 78 until the latter has been raised above the fingers 84 (full lines in FIG. 12) at which time the bag slides off the table. During the time the suction cup 34 is swung over to the conveyor, the suction cup 33 again is swung over to the scale platform 30 with the next bag and the cycle is repeated.

We claim as our invention:

1. In a machine for handling packages, the combination of, a first elongated horizontal conveyor having a terminal station at one end thereof, a second and parallel conveyor spaced laterally from said first conveyor and having an initial station disposed alongside but offset from said terminal station, a weighing device having a platform disposed between said two stations and alined with said initial station, a first member mounted to move transversely of said conveyors between a first position adjacent said terminal station and a second position adjacent said platform, an element mounted on said member and operable to engage a package at said terminal station and carry the package to said platform upon movement of the member between said first and second positions, means supporting said element on said member for lateral shifting relative to the member, mechanism operable as an incident to the movement of said member to shift said element laterally an amount corresponding to the offsetting of said stations, and a second member operable subsequently to transfer the package from said platform to the initial station of said second conveyor.

2. In a machine for handling packages, the combination of, a first elongated horizontal conveyor having a terminal station at one end thereof, a second and parallel conveyor spaced laterally from said first conveyor and having an initial station disposed alongside but offset from said terminal station, a weighing device having a platform disposed between said two stations, a first member movable transversely of said conveyors and operable to remove said package at said terminal station and transfer the package to said platform, a second member movable transversely of said conveyors and operable subsequently to transfer the package to the initial station of said second conveyor, and mechanism operable to shift one of said members laterally as it transfers the bag thereby to compensate for the offsetting of said stations.

3. In a machine for handling packages, the combination of, a first elongated horizontal conveyor having a terminal station at one end thereof, a second and parallel conveyor spaced laterally from said first conveyor and overlapping the same to dispose the initial station of the second conveyor alongside said terminal station, a weighing device having a platform disposed between said two stations and operable to sense the weight of a package on the platform, said platform comprising a plurality of spaced parallel bars inclined to the horizontal and having fingers projecting upwardly from the lower ends of the bars to hold a package on the platform, a table mounted to move from a position below the platform to a position above the platform and above said fingers, said table comprising a plurality of spaced bars paralleling the bars of said platform and alined with the spaces between the platform bars whereby the table moves through the platform, a first transfer member operable to remove a package at said terminal station and deliver the package to said platform, a timing device subsequently operable to raise said table thereby to lift the package off said platform and above said fingers, a second member operable after said table has been raised to engage the package and to carry the latter to the initial station of said second conveyor, and means responsive to said weighing device and operable to render said second member inactive for a package of improper weight thereby to permit said package to slide off said table.

4. In a machine for handling packages, the combination of, a first elongated horizontal conveyor having a terminal station at one end thereof, a second and parallel conveyor spaced laterally from said first conveyor and overlapping the same to dispose the initial station of the second conveyor alongside said terminal station, a weighing device having a platform disposed between said two stations and operable to sense the weight of a package on the platform, said platform being inclined and having fingers operable to hold a package on the platform, a table mounted to move from a position below the platform to a position above the platform, said platform and said table having parts interfitting with each other whereby the table moves through the platform, a first transfer member operable to remove a package at said terminal station and deliver the package to said platform, a timing device subsequently operable to raise said table thereby to lift the package off said platform and above said fingers, a second member operable after said table has been raised to engage the package and to carry the latter to the initial station of said second conveyor, and means responsive to said weighing device and operable to render said second member inactive for a package of improper weight thereby to permit said package to slide off said table.

5. In a machine for handling packages, the combination of, a first elongated horizontal conveyor having a terminal station at one end thereof, a second and parallel conveyor spaced laterally from said first conveyor and overlapping the same to dispose the initial station of the second conveyor alongside said terminal station, a weighing device having a platform disposed between said two stations and operable to sense the weight of a package on the platform, said platform being inclined relative to the horizontal and including holding means normally operable to hold a package on the platform, a first transfer member operable to remove a package at said terminal station and deliver the package to said platform, a second transfer member operable subsequently to transfer the package to the initial station of said second conveyor, and means responsive to said weighing device and operable to render said second member inactive for a package of predetermined weight, said holding means simultaneously being rendered inactive thereby to permit the package to slide off said platform.

6. Mechanism for weighing packages comprising a base, a weight sensing device mounted on said base, a scale platform connected to said device and comprising a plurality of spaced parallel bars, a table paralleling said platform and comprising a plurality of spaced parallel bars alined with the spaces between the bars of the platform, means supporting said table on said base to move from a first position below said platform through the platform to a second position above the platform, mechanism for periodically raising said table to said second position and returning the table to said first position, and a transfer member movable in timed relation to said table and operable to deliver a package to the table while the latter is above said platform, said table transferring the package to said platform as the table moves back to said first position.

7. In a machine for handling packages, the combination of, a first elongated horizontal conveyor having a terminal station at one end thereof, a second and parallel conveyor spaced laterally from said first conveyor and overlapping the same to dispose the initial station of the second conveyor alongside said terminal station, a weighing device having a platform disposed between said two stations and operable to sense the weight of a package on the platform, a transfer member operable to remove a package at said terminal station and deliver the package to said platform, a suction cup, means supporting said suction cup to move from a position adjacent said platform to a position adjacent the initial station of said second conveyor, a valve adapted to connect said suction cup to a vacuum source whereby the cup carries a package from said platform to said second conveyor, and means responsive to said weighing device and operable to close said valve in response to a package of improper weight whereby the suction cup is ineffective to transfer the package.

8. In a machine for handling bags, the combination of, a first elongated horizontal conveyor adapted to support and advance a filled bag in a vertical position and having a terminal station, a second and parallel conveyor spaced laterally from said first conveyor and adapted to support and advance a bag in a horizontal position, said second conveyor having an initial station disposed alongside said terminal station, a weighing device having an inclined platform disposed between said two stations, a base, an arm fulcrumed on said base to swing about an axis paralleling said conveyors, a floating lever pivotally connected at one end to the free end of said arm, a transfer member mounted on said lever to swing from a first position alongside said terminal station to a second position over said platform upon swinging of said arm and operable to transfer a bag from the terminal station to the platform, a link pivotally connected at one end to said base and at the other end to the opposite end of said lever to tilt the lever and cause said member to face said platform upon swinging of said arm, a second transfer member for moving the bag from said platform to said second conveyor, and a second and similar arm, floating lever and link supporting said second member and guiding the same to move from the platform to the second conveyor and to tilt the member to the horizontal during such movement.

9. Mechanism for weighing packages comprising a base, a scale platform, a weight sensing device mounted on said base and supporting said platform, a table parallel to said platform and mounted to move between a first position below the platform and a second position above the platform, said platform and said table having parts interfitting with each other whereby the table moves through the platform, mechanism for periodically raising said table to said second position and returning the table to said first position, a suction cup, a valve operable to connect said suction cup to a source of vacuum whereby the suction cup is effective to carry a package, means supporting said suction cup for movement to a transfer position above said platform, and a timing device operable to move said suction cup to said transfer position and to close said valve while said table is above said platform thereby to transfer the package from the suction cup to the table, said table transferring the package to said platform as the table moves back to said first position.

10. Mechanism for weighing packages comprising a base, a scale platform, a weight sensing device mounted on said base and supporting said platform, a table parallel to said platform and mounted to move between a first position below the platform and a second position above the platform, said platform and said table having parts interfitting with each other whereby the table moves through the platform, mechanism for periodically raising said table to said second position and returning the table to said first position, a transfer member movable in timed relation to said table toward said platform and operable to carry a package to a point short of the platform, said member being operable to deliver the package while said table is above said platform and moving toward said first position whereby the member and the platform move down together, and a timing device operable to release the package from said member while the member and said table are moving together thereby to transfer the package to the table, said table transferring the package to said platform as the table moves back to said first position and removing the package when the table moves to said second position a second time, and a second transfer member movable toward said platform and then away, said second member moving away from said platform as said table approaches said second position to move with the table and being responsive to said timing device to pick the package off the table during such movement.

11. Mechanism for weighing packages comprising a base, a scale platform, a weight sensing device mounted on said base and supporting said platform, a table parallel to said platform and mounted to move between a first position below the platform and a second position above the platform, said platform and said table having parts interfitting with each other whereby the table moves through the platform, mechanism for periodically raising said table to said second position and returning the table to said first position, a transfer member movable in timed relation to said table toward said platform and operable to carry a package to a point short of the platform, said member being operable to deliver the package while said table is above said platform and moving toward said first position whereby the member and the platform move down together, and a timing device operable to release the package from said member while the member and said table are moving together thereby to transfer the package to the table, said table transferring the package to said platform as the table moves back to said first position.

12. Mechanism for weighing packages comprising a base, a scale platform, a weight sensing device mounted on said base and supporting said platform, a table parallel to said platform and mounted to move between a first position below the platform and a second position above the platform, said platform and said table having parts interfitting with each other whereby the table moves through the platform, mechanism for periodically raising said table to said second position, returning the table to said first position and again raising the table to said second position, a first transfer member movable in timed relation to said table and operable to deliver a package to the table when the latter first is moved above said platform, said table transferring the package to said platform as the table moves back to said first position and removing the package from the platform upon being moved the second time to said second position, and second transfer member operable in timed relation to said table and effective to remove the package from said table when the latter moves above said platform for the second time.

13. Mechanism for weighing packages comprising a base, a scale platform, a weight sensing device mounted on said base and supporting said platform, a table parallel to said platform and mounted to move between a first position below the platform and a second position above the platform, said platform and said table having parts interfitting with each other whereby the table moves through the platform, mechanism for periodically raising said table to said second position, returning the table to said first position and again raising the table to said second position, and a transfer member moveable in timed relation to said table and operable to deliver a package to the table when the latter first is moved above said platform, said table transferring the package to said platform as the table moves back to said first position and removing the package from the platform upon returning to said second position.

References Cited in the file of this patent

UNITED STATES PATENTS

| | | |
|---|---|---|
| 2,116,895 | Howard | May 10, 1938 |
| 2,162,580 | Hopkins | June 13, 1939 |
| 2,217,983 | Hopkins | Oct. 15, 1940 |
| 2,305,212 | White | Dec. 15, 1952 |
| 2,590,704 | Howard et al. | Mar. 25, 1952 |
| 2,766,879 | Draper | Oct. 16, 1956 |

FOREIGN PATENTS

| | | |
|---|---|---|
| 265,293 | Great Britain | Feb. 4, 1927 |